Aug. 19, 1930.                L. BUEHLER, JR                      1,773,091
                                 CAN FILLER
                        Filed Dec. 27, 1927           2 Sheets-Sheet 2
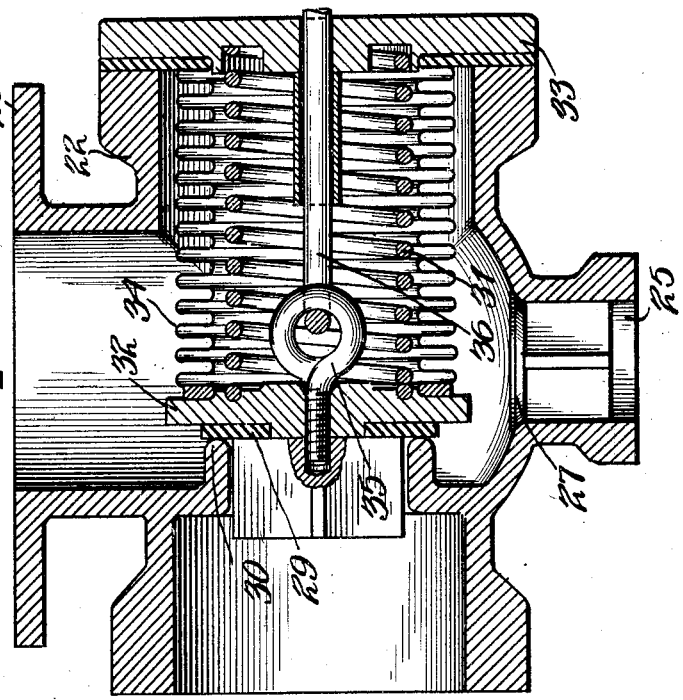
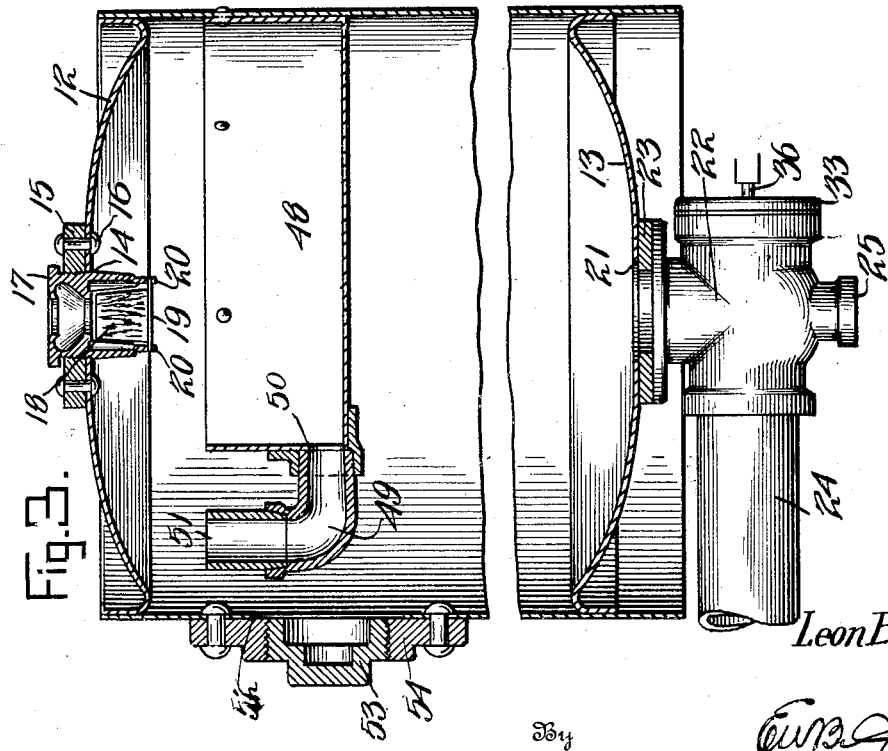
Inventor
*Leon Buehler, Jr.*
By
Attorney Patented Aug. 19, 1930

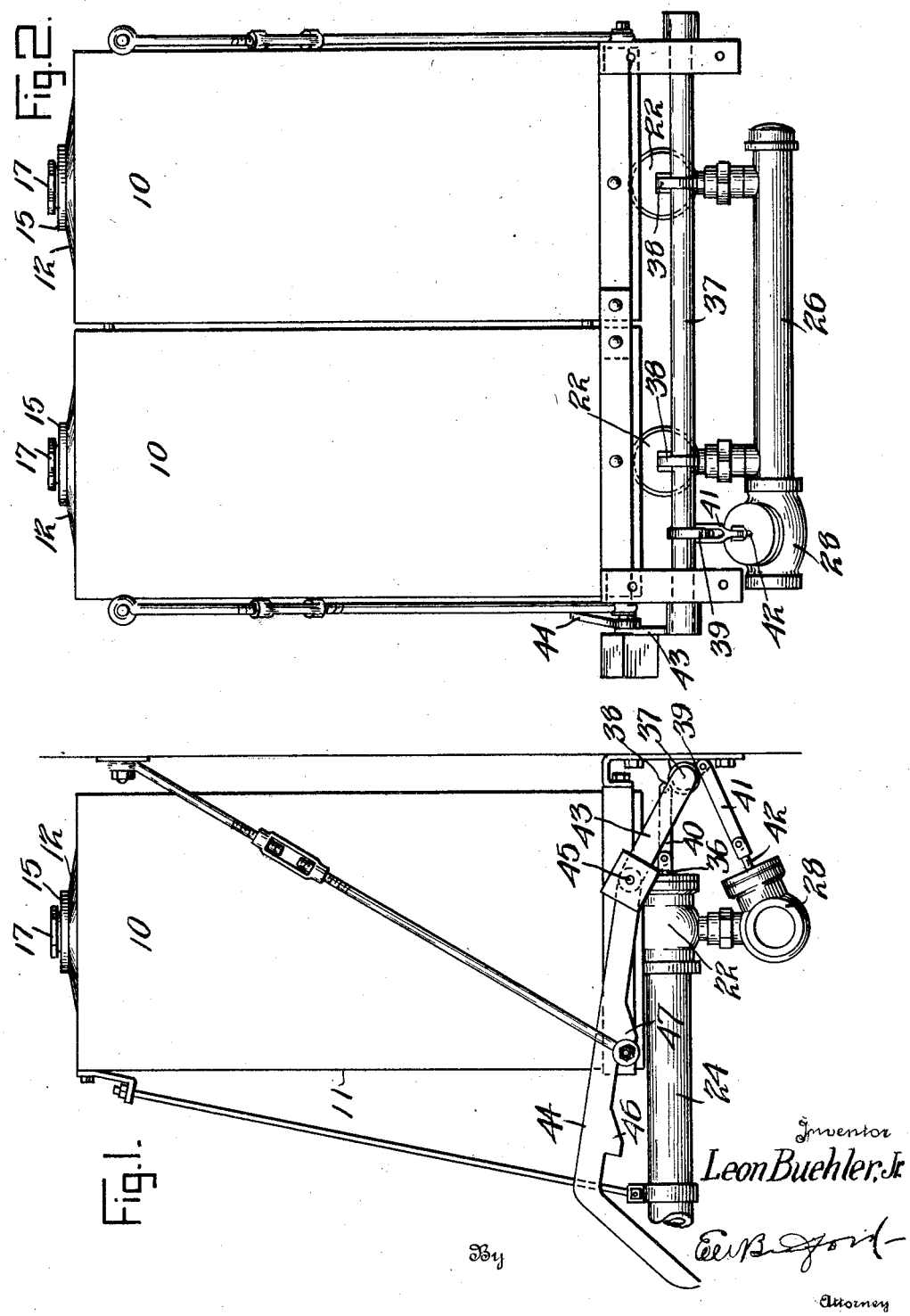

1,773,091

UNITED STATES PATENT OFFICE

LEON BUEHLER, JR., OF WAYNESBORO, PENNSYLVANIA, ASSIGNOR TO FRICK COMPANY, OF WAYNESBORO, PENNSYLVANIA, A CORPORATION

CAN FILLER

Application filed December 27, 1927. Serial No. 242,766.

My invention relates to can fillers and more specifically to devices used in filling the cans in which the blocks of ice are frozen in ice making plants. It is an object of the invention to provide a filler which will operate to fill each can with the same amount of water so that the blocks of ice will all freeze in the same length of time and will be of the same size.

In can fillers heretofore in use an open tank has been employed in which the quantity of water was regulated by a float in the tank. These floats were not accurate so that the quantity of water supplied to the several ice cans was not constant. In my invention a positive quantity of water is delivered each time the tanks are emptied for the tanks are filled each time. An air vent in the top of the tank provides means of escape for the air as the tank fills but is closed by a float valve when the water fills the tank. The volume of water supplied by a tank is varied by varying the volumetric size of displacing means within the tank itself.

Referring to the accompanying drawings which are made a part hereof and on which similar reference characters indicate similar parts, Figure 1 is a perspective side view of a filling tank.

Figure 2 is a perspective front view showing a plurality of tanks.

Figure 3 is a sectional view through the tank showing the valve and the interior of the tank.

Figure 4 is a detail view of the valve.

In the drawings numeral 10 indicates in general outline a tank used in my invention. This tank consists of a cylindrical wall 11 and upper and lower ends 12 and 13. The upper end is perforated to provide an outlet for air during the filling of the tank. A washer member 15 is attached to the tank by means of bolts or rivets 16 and provides means for holding the valve body 17 which is screw threaded therethrough. The valve body is provided with a float valve 18 held from dropping off its seat by a bar 19 attached to members 20 on the valve seat. The valve 18 is preferably of cork or any other substance which will float upon the surface of the water and at the same time seat so as to prevent the escape of water when the water reaches the top of the tank.

The lower end 13 of the tank 10 is perforated at 21. This port is connected with a valve casing 22 to which are connected suitable inlet and outlet pipes for the admission and exhaust of fluid into and from the tank as will be more fully explained.

The valve housing 22 has a flange 23 which is suitably secured to the bottom 13 of the tank. A pipe 24 leads from the valve casing to the point to which the fluid is to be delivered. The inlet port 25 of the valve casing is connected to a fluid manifold inlet pipe 26. A check valve 27 provides for admission of fluid to the tank but prevents its return to the pipe 26. A valve 28 controls inlet for fluid to the pipe 26.

As shown in Fig. 4, the valve casing 22 has a spring seated valve 29 therein. This valve is adapted to seat on the seat 30 and is held thereon by compression spring 31 held between the disk 32 on the valve and the end cover 33 of the valve casing. A bellows 34 surrounds the compression spring 31 and is securely fastened to the disk 32 and to the end cover 33. This bellows prevents the fluid in the tank from acting against the disk 32 and thus relieves the pressure on the outer surface of the disk 32 and hence gives a balanced valve which may more easily be lifted from its seat. An eye screw 35 is fastened in the valve 29. A rod or link 36 passes out through the end cover 33 and provides means for manually lifting the valve from its seat. This is done in the following manner: A rock shaft 37 has arms 38 and 39 thereon. A link 40 connects the arm 38 with the link 36. A similar link 41 connects the arm 39 with the valve stem 42 on the inlet valve 28. This latter valve is similar in structure to the outlet valve just described.

The rock shaft 37 has an arm 43 to which is pivotally connected a lever 44 at 45. The lever 44 has lugs 46 and 47 on the lower side for engaging a catch to hold the lever in position to hold the valves in open or closed position as desired. When in the position shown in Fig. 1, the inlet valve 28 is open and the exhaust valve is closed. When the lever 44 is pushed to the right the arms 38 and 39 will rock to close the inlet valve and open the exhaust valve. The bellows prevents the head of fluid in the tank from exerting its pressure against the valve and so renders the operation of these valves relatively easy.

Within the tank 10 and attached to the side thereof is a pan 48. This pan has an L-shaped pipe 49 extending from the bottom and bent upward as shown in Fig. 3. The L-shaped pipe 49 enters the end of the pan 48 through opening 50. This elbow is not rigidly attached to the pan 48 but is so inserted as to allow the elbow to be turned down so as to bring the upper end 51 below the top of the tank 48 or to bring it to any level desired. The elbow 49, as may be seen, may be turned so as to allow any fluid which might be caught in the pan 48 to escape into the tank 10 or to allow any predetermined proportion of the volume of the pan 48 to be exhausted into the tank 10.

The tank 10 is provided with an opening 52 adjacent the L-shaped pipe 49 in the pan 48. The opening is normally closed by a plug 53 screw threaded into a washer or plate 54 which plate is fastened to the side of the tank. The purpose of this opening is to permit the operator to manually adjust the angular position of the L-shaped pipe 49 to regulate the amount of liquid which may be retained in the pan 48 when the tank is emptied.

The operation of the device is as follows: To fill the tank the lever 44 is pulled to the left, as shown in Fig. 1, to allow the exhaust valve to be seated by the compression spring 31 and the inlet valve to open. Fluid then passes through the valve 28, the manifold 26 and the check valve 27 around the bellows 34 into the tanks 10. The liquid rises in the tank and fills it, the air in the top of the tank, meanwhile, escaping around the valve 18 through the top of the tank. When the liquid has reached the top of the tank the valve 18, floating upon the surface of the water closes the outlet and prevents escape of the fluid. As the liquid rises above the top of the pan 48 this pan is filled. To empty the tank the lever is shifted to the right, as shown in Fig. 1, and the inlet valve is closed and the exhaust valve is opened. The liquid then passes out of the tank through the opening 21 into the exhaust pipe 24. The pan 48 will prevent some of the liquid from flowing out of the tank. The amount of liquid retained in this pan will depend upon the position of the end 51 of the L-shaped pipe 49. In order to regulate the quantity of liquid retained in the tank, the end 51 may be positioned at any desired level as described. The capacity of the tank, therefore, may be regulated within predetermined limits. The pan 48 may be of any desired size so as to vary the capacity of the tank from its maximum to any predetermined minimum. The check valve 27 prevents passage of fluid from one tank to the other when a number of tanks are used which might occur in case one tank emptied faster than the other.

As stated at the outset, can filling devices have usually relied upon a float in order to give a measured quantity of liquid to each can. Floats were unreliable and would not deliver a constant volume. With my device the float has been abolished and a positive volume which is always constant is delivered at each filling operation. The volume also may be regulated with very nice precision so as to suit cans of any capacity. The balanced valves provide ease of operation.

It will be appreciated, furthermore, that the whole assembly is relatively simple and has very few parts to get out of order and the parts furthermore are easily accessible and removable in case they do get out of order for any reason.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A can filling device comprising a tank, inlet and outlet ports to and from said tank, a fluid container mounted within said tank and adapted to be filled with liquid as the tank is filled and to retain the same when the tank is emptied, and means for varying the capacity of the said container, substantially as set forth.

2. A can filling device comprising a tank, inlet and outlet ports to and from said tank, a vessel mounted within said tank having a pipe in communication with its interior and extending through one side and normally bent upward but tiltable to any predetermined angle from vertical, the said vessel being adapted to fill with liquid as the tank fills and to retain the liquid as the tank empties, whereby the effective volume of liquid dispensed from the tank is lessened by the volume of the said vessel, the said pipe being tiltable to vary the displacement of the vessel from zero to its maximum volume when filled with liquid, substantially as set forth.

In witness whereof, I have hereunto set my hand at Waynesboro, Pennsylvania, this twentieth day of December, A. D. nineteen hundred and twenty-seven.

LEON BUEHLER, Jr.